US008728683B2

(12) United States Patent
Fukuta et al.

(10) Patent No.: US 8,728,683 B2
(45) Date of Patent: May 20, 2014

(54) FUEL CELL

(75) Inventors: Masahiro Fukuta, Shioya-gun (JP);
Kentaro Ishida, Shioya-gun (JP);
Tatsuru Shishido, Sakura (JP)

(73) Assignee: Honda Motor Co., Ltd., Tokyo (JP)

( * ) Notice: Subject to any disclaimer, the term of this patent is extended or adjusted under 35 U.S.C. 154(b) by 698 days.

(21) Appl. No.: 12/783,956

(22) Filed: May 20, 2010

(65) Prior Publication Data

US 2010/0297525 A1 Nov. 25, 2010

(30) Foreign Application Priority Data

May 20, 2009 (JP) .................................. 2009-122401
May 20, 2009 (JP) .................................. 2009-122403

(51) Int. Cl.
*H01M 2/14* (2006.01)
*H01M 8/04* (2006.01)

(52) U.S. Cl.
USPC ............ 429/511; 429/507; 429/514; 429/516

(58) Field of Classification Search
USPC ......................................... 429/514, 507, 516
See application file for complete search history.

(56) References Cited

U.S. PATENT DOCUMENTS

| 3,565,693 | A * | 2/1971 | Tapsell ......................... 429/463 |
| 7,648,791 | B2 | 1/2010 | Sakano et al. |
| 2004/0157106 | A1 | 8/2004 | Sugiura et al. |
| 2006/0110643 | A1* | 5/2006 | Sakano et al. .................. 429/30 |
| 2008/0268319 | A1 | 10/2008 | Sakano et al. |

FOREIGN PATENT DOCUMENTS

| JP | 51-30873 | 3/1976 |
| JP | 60-51027 | 4/1985 |
| JP | 3026817 | 5/1996 |
| JP | 2000-12067 | 1/2000 |
| JP | 2004-241207 | 8/2004 |
| JP | 2004-241208 | 8/2004 |
| JP | 2005-78827 | 3/2005 |
| JP | 2006-147460 | 6/2006 |
| JP | 2006-210060 | 8/2006 |
| JP | 2007-179815 | 7/2007 |
| JP | 2007-250208 | 9/2007 |
| JP | 2008-27761 | 2/2008 |
| JP | 2008-168437 | 7/2008 |

OTHER PUBLICATIONS

Japanese Office Action for Application No. 2009-122403, dated Aug. 30, 2011.
Japanese Office Action for Application No. 2009-122401, dated Aug. 30, 2011.

* cited by examiner

*Primary Examiner* — Matthew Merkling
(74) *Attorney, Agent, or Firm* — Nelson Mullins Riley & Scarborough LLP; Anthony A. Laurentano

(57) ABSTRACT

A cell unit of a fuel cell includes a first separator, a first membrane electrode assembly, a second separator, a second membrane electrode assembly, and a third separator. Resin connecting sections are provided in the outer circumferential ends of the first separator, the second separator, and the third separator. A coupling pin is molded integrally with the resin connecting section of the first separator. A first hole and a second hole are formed on both sides of the coupling pin for selectively inserting a rebuilt pin into either of the first and second holes. A hole for inserting the coupling pin is formed at the center, and the first hole and the second hole are formed on both sides of the hole, in each of the resin connecting sections of the second and third separators.

9 Claims, 19 Drawing Sheets

FUEL CELL

CROSS-REFERENCE TO RELATED APPLICATION

This application is based upon and claims the benefit of priority from Japanese Patent Applications No. 2009-122401 filed on May 20, 2009 and No. 2009-122403 filed on May 20, 2009, of which the contents are incorporated herein by reference.

BACKGROUND OF THE INVENTION

1. Field of the Invention

The present invention relates to a fuel cell formed by stacking a membrane electrode assembly and separators. The membrane electrode assembly includes a pair of electrodes, and an electrolyte membrane interposed between the electrodes. Further, the present invention relates a method of producing the fuel cell.

2. Description of the Related Art

For example, a solid polymer electrolyte fuel cell employs a membrane electrode assembly (MEA) which includes an anode, a cathode, and an electrolyte membrane interposed between the anode and the cathode. The electrolyte membrane is a polymer ion exchange membrane. The membrane electrode assembly and separators sandwiching the membrane electrode assembly make up a unit cell. In use, generally, a predetermined number of unit cells of this type are stacked together to form a fuel cell stack.

Normally, several tens to hundreds of fuel cells are stacked together to form a fuel cell stack. It is necessary to accurately position the components of the fuel cell and stack the fuel cells in alignment with each other accurately. In this regard, for example, a fuel cell as disclosed in Japanese Laid-Open Patent Publication No. 2004-241208 is known.

In the fuel cell, a plurality of metal clip members are provided for supporting the outer circumferences of the first and second separators at a plurality of positions. Each of the metal clip members includes a side plate and first and second tongues folded at ends of the side plate for holding the outer circumferences of the first and second separators. The first and second tongues are longer than the side plate, and have elasticity.

In the fuel cell, operation of attaching the metal clip members at the plurality of positions is required for each of the fuel cells. Therefore, the operation of attaching the metal clip members is laborious. In particular, at the time of assembling the fuel cell stack by stacking several hundreds of fuel cells, considerable time and labor are required for the operation. Therefore, the assembling operation cannot be performed efficiently.

Further, when it is necessary to analyze the fuel cell, or when it is necessary to replace parts of the fuel cell, the fuel cell needs to be disassembled. At this time, metal clip members need to be detached, and this detaching operation is considerably laborious.

SUMMARY OF THE INVENTION

The present invention has been made to solve the problems of this type, and an object of the present invention is to provide a fuel cell which makes it possible to assemble a plurality of the fuel cells easily and rapidly and carry out the assembling operation of the fuel cell efficiently, and to provide a method of producing such a fuel cell.

The present invention relates to a fuel cell formed by stacking a membrane electrode assembly and separators. The membrane electrode assembly includes a pair of electrodes and an electrolyte membrane interposed between the electrodes.

The fuel cell includes a resin connecting section provided in an outer circumferential end of each of the separators for tightly connecting the separators provided at opposite ends in the stacking direction by a first resin coupling member. The resin connecting section includes at least a first connecting portion and a second connecting portion for allowing, instead of the first resin coupling member, a second resin coupling member for tightly connecting the separators at opposite ends in the stacking direction to be selectively placed in the first connecting portion or the second connecting portion.

Further, the present invention relates to a fuel cell including a cell unit formed by stacking a membrane electrode assembly and separators. The membrane electrode assembly includes a pair of electrodes and an electrolyte membrane interposed between the electrodes. The membrane electrode assembly and the separators of the cell unit (162) are joined together by a joint pin. Further, the present invention relates to a method of producing the fuel cell.

The joint pin includes a large diameter flange engaged with one end of the cell unit, and a head engaged with the other end of the cell unit. A recess for holding the joint pin by suction is formed in the large diameter flange.

Further, the production method includes the steps of, suctioning a recess formed in a large diameter flange of the joint pin to fixedly position the joint pin at an assembling position, inserting the joint pin into a hole formed in the cell unit for placement of the cell unit, and expanding the diameter of an end of the joint pin exposed from the cell unit to the outside to form a head, and holding the membrane electrode assembly and the separators of the cell unit together between the head and the large diameter flange.

According to the present invention, the components between the separators of the fuel cell are tightly connected by the first resin coupling member. Therefore, the fuel cell can be assembled efficiently with simple operation.

Further, at the time of disassembling the assembled fuel cell, the first resin coupling member is removed, and the second resin coupling member is placed in the first connecting portion or the second connecting section. Therefore, the fuel cell can be reassembled easily and rapidly.

Further, at least the first connecting portion and the second connecting portion are provided for placing the second resin coupling member. Therefore, disassembling operation and assembling operation of the fuel cell can be performed multiple times, and it becomes possible to suitably perform various operations such as replacement of parts, analysis of the fuel cell, etc.

Further, in every fuel cell, the second resin coupling members can be arranged alternatively at the first connecting portions and the second connecting portions. Thus, the adjacent second resin coupling members in the stacking direction are not overlapped with each other. It becomes possible to suppress the dimension in the stacking direction.

Further, according to the present invention, the recess is provided at the large diameter flange of the joint pin. By suctioning the recess, each joint pin can be fixedly positioned reliably. Thus, in the state where a plurality of joint pins are fixedly positioned, the cell unit can be provided integrally with the respective joint pins.

Thus, in the case where particularly a large number of small joint pins are used, the operation of assembling components of the cell unit together through the joint pins is accurately and rapidly performed, whereby workability thereof is improved.

Further, according to the present invention, by suctioning the recess, the joint pin is fixedly positioned reliably at the assembling position. In this state, the joint pin is inserted into a hole of the cell unit. Thus, the operation of inserting the joint pin into a hole of the cell unit is simplified.

Then, by expanding the diameter at an end of the joint pin exposed from the cell unit to the outside, components of the cell unit can be tightened together by the joint pin. Thus, the operation of producing the cell unit is performed simply and rapidly.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
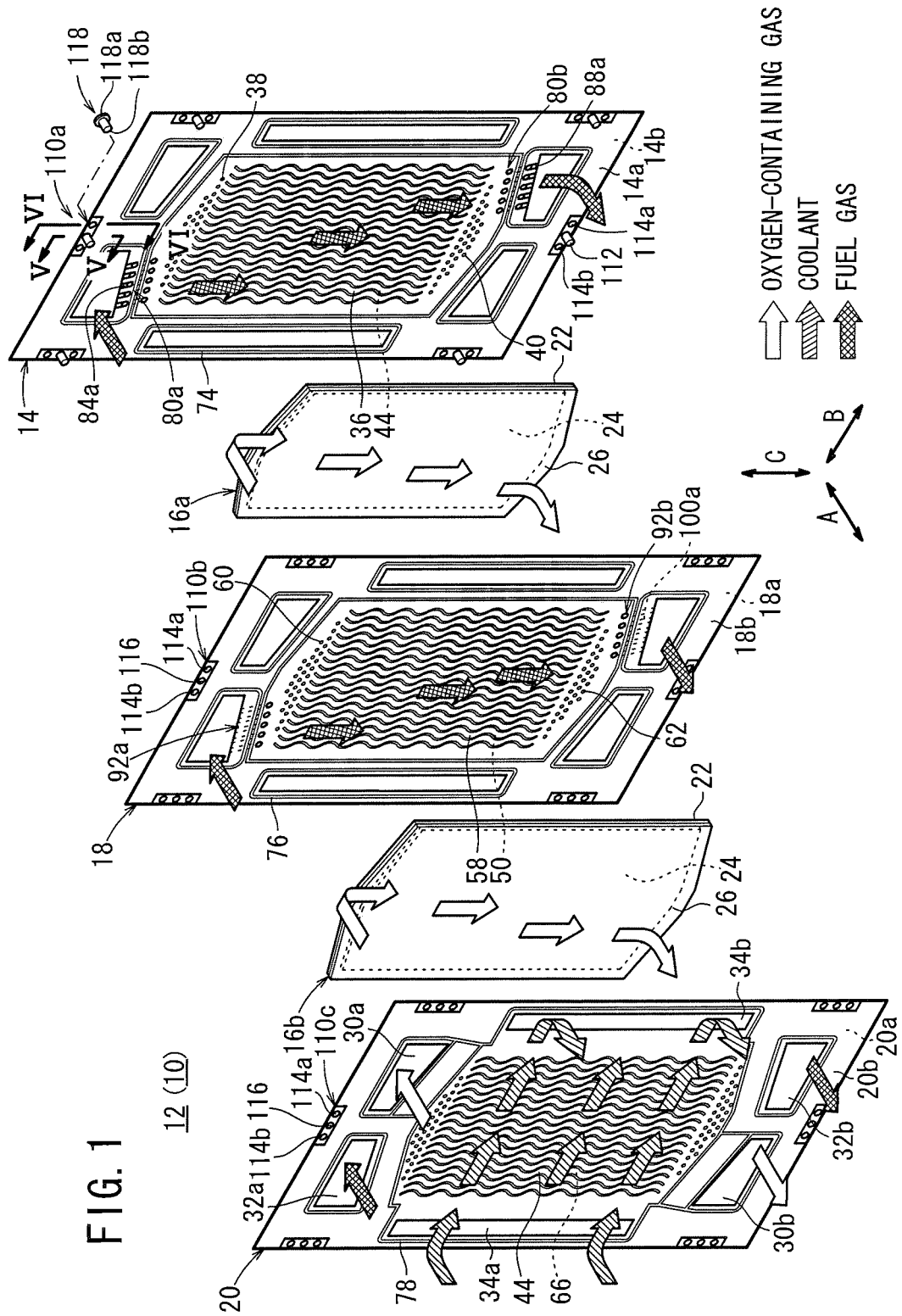
FIG. 1 is a perspective view schematically showing main components of a fuel cell according to a first embodiment of the present invention.

As shown in FIG. 1, the fuel cell 10 according to a first embodiment of the present invention is formed by stacking a plurality of cell units 12 in a horizontal direction indicated by an arrow A or in a gravity direction indicated by an arrow C. Each of the cell units 12 includes a first separator 14, a first membrane electrode assembly (electrolyte electrode assembly) (MEA) 16a, a second separator 18, a second membrane electrode assembly 16b, and a third separator 20.

For example, the first separator 14, the second separator 18, and the third separator 20 are metal separators of steel plates, stainless steel plates, aluminum plates, plated steel sheets, or metal plates having anti-corrosive surfaces by surface treatment. Each of the first separator 14, the second separator 18, and the third separator 20 is formed by corrugating a metal thin plate under pressure, and has a corrugated shape in cross section. Instead of using the metal separators, carbon separators may be used as the first separator 14, the second separator 18, and the third separator 20.

The surface area of the first membrane electrode assembly 16a is smaller than the surface area of the second membrane electrode assembly 16b. For example, each of the first membrane electrode assembly 16a and the second membrane electrode assembly 16b includes an anode 24, a cathode 26, and a solid polymer electrolyte membrane 22 interposed between the anode 24 and the cathode 26. The solid polymer electrolyte membrane 22 is formed by impregnating a thin membrane of perfluorosulfonic acid with water, for example.

The surface area of the anode 24 is smaller than the surface area of the cathode 26, that is the so-called stepped-type MEA. Each of the solid polymer electrolyte membrane 22, the anode 24, and the cathode 26 has cutouts at upper and lower positions of both ends in the direction indicated by the arrow B in order to reduce the surface areas thereof.

Each of the anode 24 and the cathode 26 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the anode 24 and the electrode catalyst layer of the cathode 26 are fixed to both surfaces of the solid polymer electrolyte membrane 22, respectively.

At an upper end of the cell unit 12 in the longitudinal direction indicated by the arrow C, an oxygen-containing gas supply passage 30a for supplying an oxygen-containing gas, and a fuel gas supply passage 32a for supplying a fuel gas such as a hydrogen-containing gas are provided. The oxygen-containing gas supply passage 30a and the fuel gas supply passage 32a extend through the cell unit 12 in the direction indicated by the arrow A.

At a lower end of the cell unit 12 in the longitudinal direction indicated by the arrow C, a fuel gas discharge passage 32b for discharging the fuel gas and an oxygen-containing gas discharge passage 30b for discharging the oxygen-containing gas are provided. The fuel gas discharge passage 32b and the oxygen-containing gas discharge passage 30b extend through the cell unit 12 in the direction indicated by the arrow A.

At one end of the cell unit 12 in the lateral direction indicated by the arrow B, a coolant supply passage 34a for supplying a coolant is provided, and at the other end of the cell unit 12 in the lateral direction, a coolant discharge passage 34b for discharging the coolant is provided. The coolant supply passage 34a and the coolant discharge passage 34b extend through the cell unit 12 in the direction indicated by the arrow A.

Figure 2:
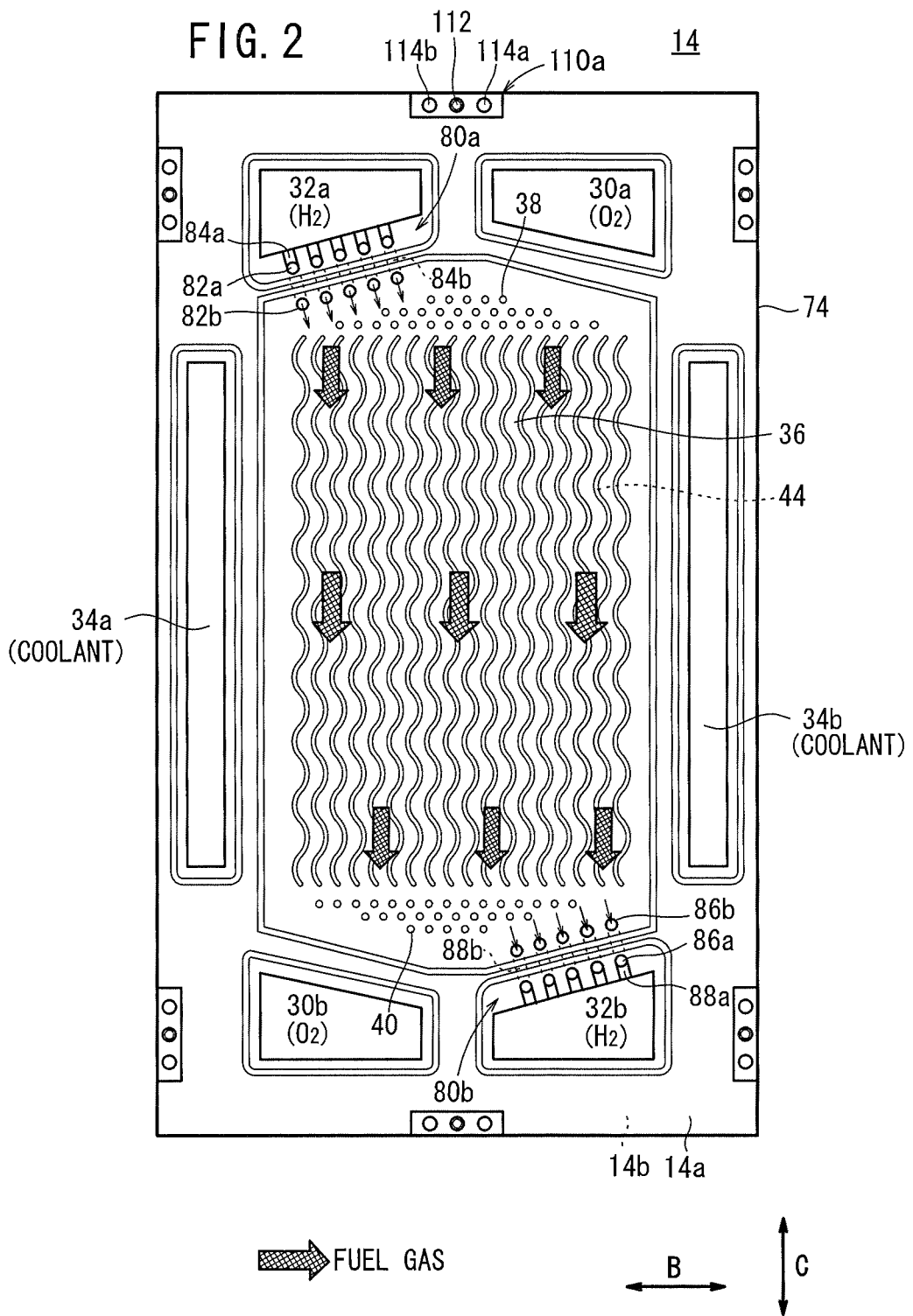
FIG. 2 is a view showing one surface of a first separator of the fuel cell.

As shown in FIG. 2, the first separator 14 has a first fuel gas flow field 36 on its surface 14a facing the first membrane electrode assembly 16a. The first fuel gas flow field 36 is connected to the fuel gas supply passage 32a and the fuel gas discharge passage 32b. The first fuel gas flow field 36 includes a plurality of corrugated flow grooves extending in the direction indicated by the arrow C. An inlet buffer 38 and an outlet buffer 40 each having bosses are provided adjacent to the inlet (upper end) and the outlet (lower end) of the first fuel gas flow field 36, respectively.

A coolant flow field 44 is formed on a surface 14b of the first separator 14. The coolant flow field 44 is connected to the coolant supply passage 34a and the coolant discharge passage 34b. The first fuel gas flow field 36 is formed on the back surface of the coolant flow field 44.

Figure 3:
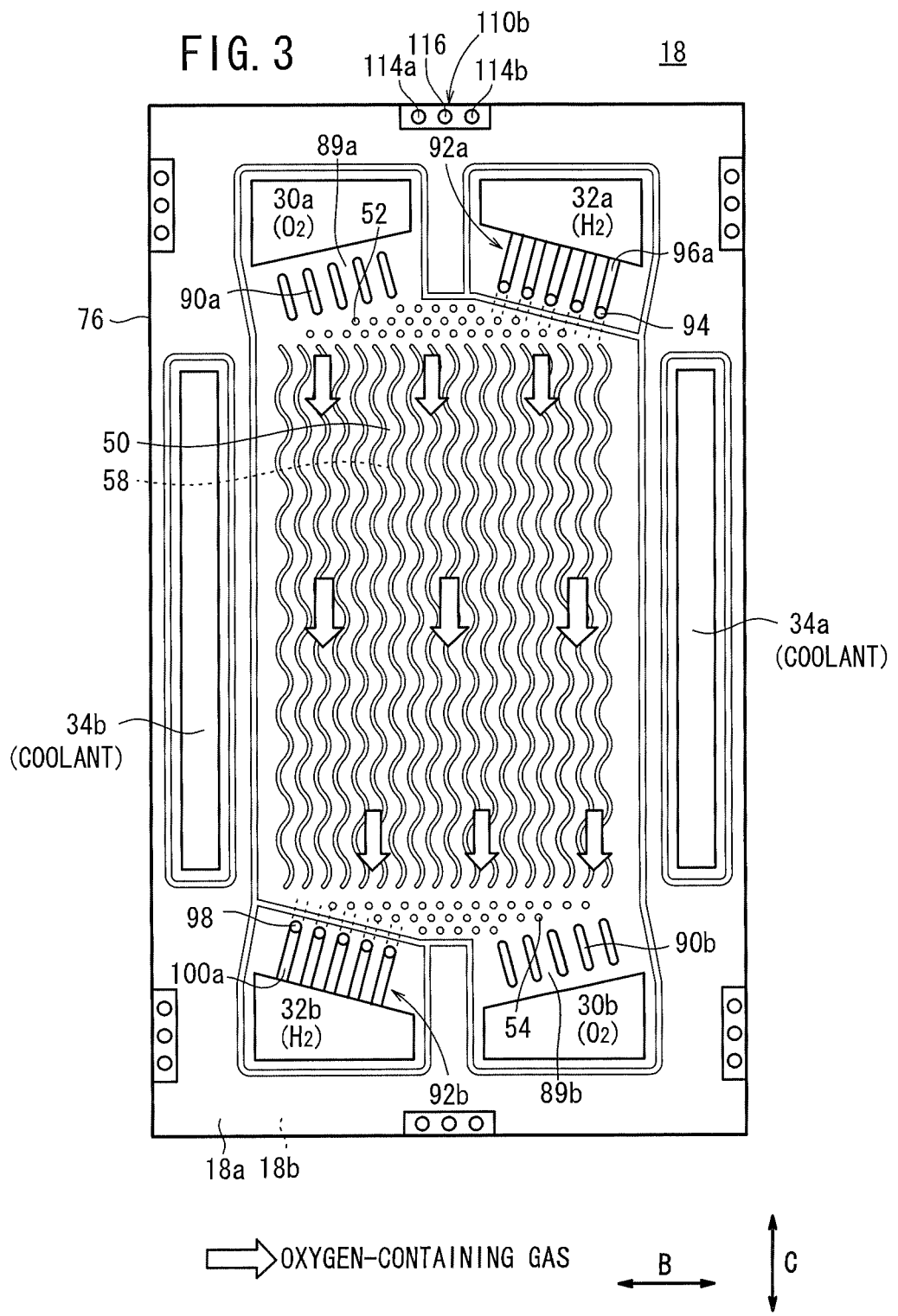
FIG. 3 is a view showing one surface of a second separator of the fuel cell.

As shown in FIG. 3, the second separator 18 has a first oxygen-containing gas flow field 50 on its surface 18a facing the first membrane electrode assembly 16a. The first oxygen-containing gas flow field 50 is connected to the oxygen-containing gas supply passage 30a and the oxygen-containing gas discharge passage 30b. The first oxygen-containing gas flow field 50 includes a plurality of corrugated flow grooves extending in the direction indicated by the arrow C. An inlet buffer 52 and an outlet buffer 54 each having bosses are provided adjacent to the inlet (upper end) and the outlet (lower end) of the first oxygen-containing gas flow field 50, respectively.

As shown in FIG. 1, the second separator 18 has a second fuel gas flow field 58 on its surface 18b facing the second membrane electrode assembly 16b. The second fuel gas flow field 58 is connected to the fuel gas supply passage 32a and the fuel gas discharge passage 32b. The second fuel gas flow field 58 includes a plurality of corrugated flow grooves extending in the direction indicated by the arrow C. An inlet buffer 60 and an outlet buffer 62 each having bosses are provided adjacent to the inlet (upper end) and the outlet (lower end) of the second fuel gas flow field 58, respectively.

Figure 4:
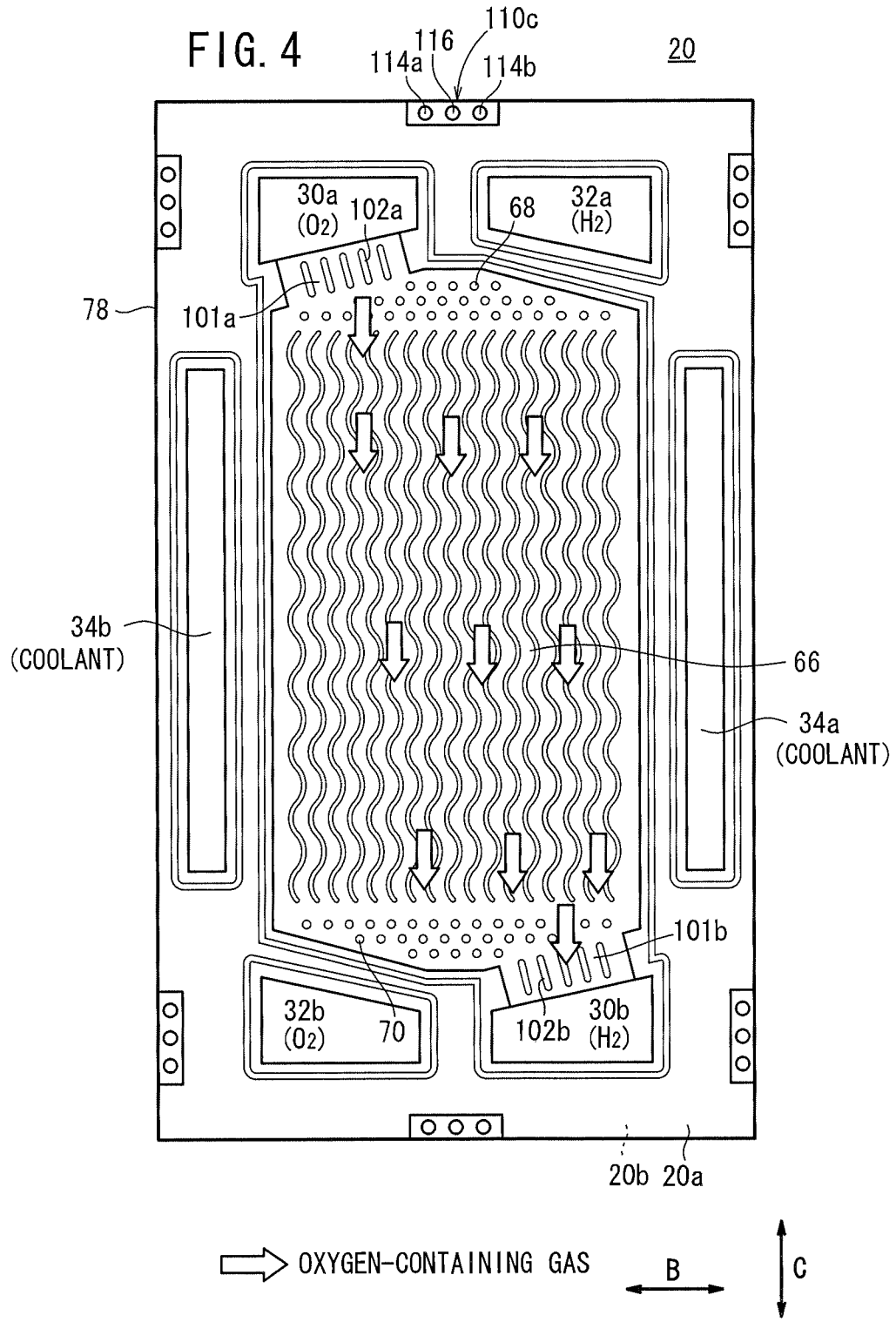
FIG. 4 is a front view showing a third separator of the fuel cell.

As shown in FIG. 4, the third separator 20 has a second oxygen-containing gas flow field 66 on its surface 20a facing the second membrane electrode assembly 16b. The second oxygen-containing gas flow field 66 is connected to the oxygen-containing gas supply passage 30a and the oxygen-containing gas discharge passage 30b.

The second oxygen-containing gas flow field 66 includes a plurality of corrugated flow grooves extending in the direction indicated by the arrow C. An inlet buffer 68 and an outlet buffer 70 each having bosses are provided adjacent to the inlet (upper end) and the outlet (lower end) of the second oxygen-containing gas flow field 66, respectively.

As shown in FIG. 1, the coolant flow field 44 connected to the coolant supply passage 34a and the coolant discharge passage 34b is formed on a surface 20b of the third separator 20. The coolant flow field 44 is formed by overlapping the corrugated surfaces on the back of the first fuel gas flow field 36 and on the back of the second oxygen-containing gas flow field 66.

A first seal member 74 is formed integrally on the surfaces 14a, 14b of the first separator 14, around the outer circumferential end of the first separator 14. A second seal member 76 is formed integrally on the surfaces 18a, 18b of the second separator 18, around the outer circumferential end of the second separator 18. A third seal member 78 is formed integrally on the surfaces 20a, 20b of the third separator 20, around the outer circumferential end of the third separator 20.

For example, the first to third seal members 74, 76, and 78 are made of seal material, cushion material or packing material such as EPDM (Ethylene Propylene Diene Monomer), NBR (Nitrile Butadiene Rubber), fluoro rubber, silicone rubber, fluoro silicone rubber, butyl rubber, natural rubber, styrene rubber, chloroprene rubber, or acrylic rubber.

As shown in FIGS. 1 and 2, the first separator 14 has a first inlet connection channel 80a connecting the fuel gas supply passage 32a and the first fuel gas flow field 36, and a first outlet connection channel 80b connecting the fuel gas discharge passage 32b and the first fuel gas flow field 36. The first inlet connection channel 80a includes a plurality of outer supply holes 82a and a plurality of inner supply holes 82b.

As shown in FIG. 1, a plurality of grooves 84a connecting the fuel gas supply passage 32a and the outer supply holes 82a are provided on the surface 14a of the first separator 14. As shown in FIG. 2, a plurality of grooves 84b connecting the outer supply holes 82a and the inner supply holes 82b are formed on the surface 14b of the first separator 14. Likewise, the first outlet connection channel 80b includes a plurality of outer discharge holes 86a and a plurality of inner discharge holes 86b.

A plurality of grooves 88a connecting the fuel gas discharge passage 32b and the outer discharge holes 86a are formed on the surface 14a of the first separator 14. A plurality of grooves 88b connecting the outer discharge holes 86a and the inner discharge holes 86b are formed on the surface 14b of the first separator 14 (see FIG. 2).

As shown in FIG. 3, a plurality of receivers 90a, 90b forming grooves of the inlet connection channel 89a and grooves of the outlet connection channel 89b are provided at a portion connecting the oxygen-containing gas supply passage 30a and the first oxygen-containing gas flow field 50, and at a portion connecting the oxygen-containing gas discharge passage 30b and the first oxygen-containing gas flow field 50.

The second separator 18 has a second inlet connection channel 92a connecting the fuel gas supply passage 32a and the second fuel gas flow field 58, and a second outlet connection channel 92b connecting the fuel gas discharge passage 32b and the second fuel gas flow field 58. The second inlet connection channel 92a has supply holes 94. Grooves 96a connecting the fuel gas supply passage 32a and the supply holes 94 are formed on the surface 18a of the second separator 18.

Likewise, the second outlet connection channel 92b includes a plurality of discharge holes 98. A plurality of grooves 100a connecting the discharge holes 98 to the fuel gas discharge passage 32b are formed on the surface 18a of the second separator 18.

As shown in FIG. 4, in the third separator 20, a plurality of receivers 102a, 102b forming grooves of the inlet connection channel 101a and grooves of the outlet connection channel 101b are provided at a portion connecting the oxygen-containing gas supply passage 30a and the second oxygen-containing gas flow field 66, and at a portion connecting the oxygen-containing gas discharge passage 30b and the second oxygen-containing gas flow field 66.

As shown in FIG. 1, a plurality of resin connecting sections 110a, 110b, 110c are provided at a plurality of positions in the outer circumferential end of each of the first separator 14, the second separator 18, and the third separator 20. For example, each of the resin connecting sections 110a, 110b, and 110c is made of polyphenylene sulfide (PPS), polyacetal (POM), polybutylene terephthalate (PBT), polyetheretherketone (PEEK), liquid crystal polymer (LCP), polyimide or ABS resin.

The resin connecting sections 110a, 110b, and 110c are formed by fixing molded pieces formed by molding insulating resin to cutout portions in the metal plates of the first separator 14, the second separator 18, and the third separator 20 by crimping, adhesion or the like. Alternatively, the resin connecting sections 110a, 110b, and 110c may be formed integrally with the cutout portions of the metal plates by injection molding.

As shown in FIGS. 1 and 2, a coupling pin (first resin coupling member) 112 projecting on the surface 14a is formed integrally with the resin connecting section 110a of the first separator 14. At least a first hole (first connecting portion) 114a and a second hole (second connecting portion) 114b are formed on both sides of the coupling pin 112 for selectively placing a rebuilt pin (second resin coupling member) 118 described later in the first hole 114a or the second hole 114b. In the embodiments in the specification, the number of the holes formed on both sides of the coupling pin is two. However, the number thereof is not limited to two, and the number thereof may be three or more.

As shown in FIG. 1, a hole 116 used for tightening the first separator 14, the second separator 18, and the third separator 20 when the first separator 14, the second separator 18, and the third separator 20 are newly assembled is provided at the center of each of the resin connecting sections 110b, 110c of the second and third separators 18, 20. The coupling pin 112 is inserted into the hole 116. Further, at least a first hole 114a and a second hole 114b are provided on both sides of the hole 116.

Figure 6:
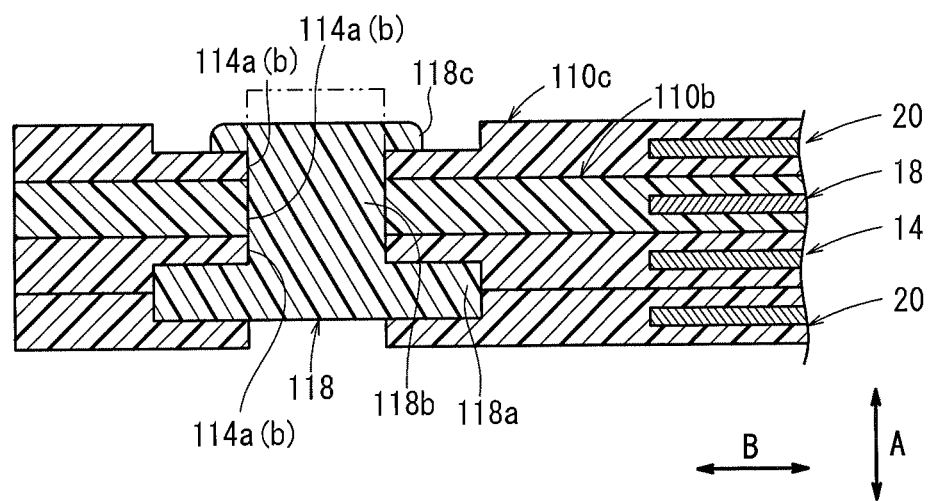
FIG. 6 is a cross sectional view showing a state where a rebuilt pin is inserted into the resin connecting section, taken along a line VI-VI in FIG. 1.

As shown in FIGS. 1 and 6, the rebuilt pin 118 used instead of the coupling pin 112 is made of insulating resin as with the resin connecting sections 110a to 110c. The rebuilt pin 118 includes a large diameter flange 118a which has a large diameter in comparison with the first hole 114a and the second hole 114b of the first separator 14, and contacts the surface 14b of the first separator 14.

A column 118b projecting from the flange 118a is selectively inserted into the first hole 114a or the second hole 114b. The front end of the column 118b forms a head 118c having a larger diameter formed by welding treatment to be described later, and the head 118c is fixedly engaged with the surface 20b of the third separator 20.

The head 118c of the rebuilt pin 118 may be formed beforehand, and a plurality of slits extending axially may be formed in the head 118c so that the head 118c can be expanded, or contracted radially.

Operation of assembling the fuel cell 10 will be described below.

Figure 7:
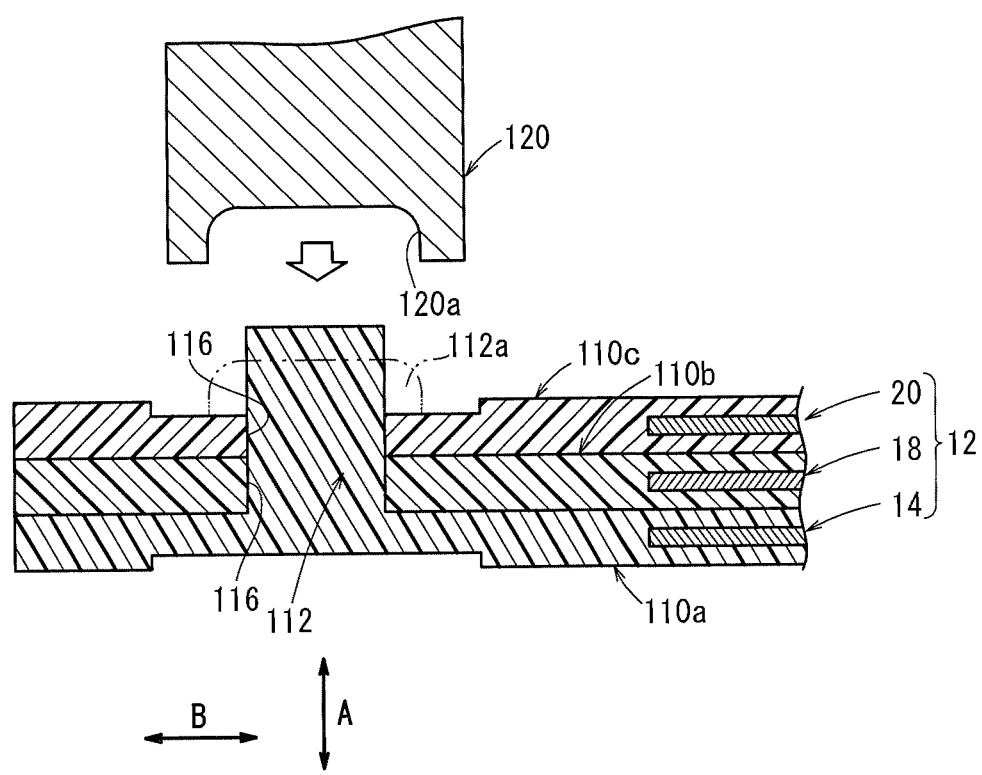
FIG. 7 is a view showing a state where the fuel cell is assembled using the resin connecting section.

At the time of newly assembling each of the cell unit 12, as shown in FIG. 7, the coupling pin 112 provided in the resin connecting section 110a of the first separator 14 is inserted into the holes 116 of the resin connecting sections 110b, 110c of the second and third separators 18, 20.

In this state, a welding chip 120 of a welding die heated to a predetermined temperature is pressed against the front end of the coupling pin 112. Specifically, the welding chip 120 heated to a temperature in a range of 250° C. to 300° C. is pressed against the front end of the coupling pin 112 at a pressure in a range of 1 N to 2 N for a period in a range of 10 to 30 seconds.

Figure 5:
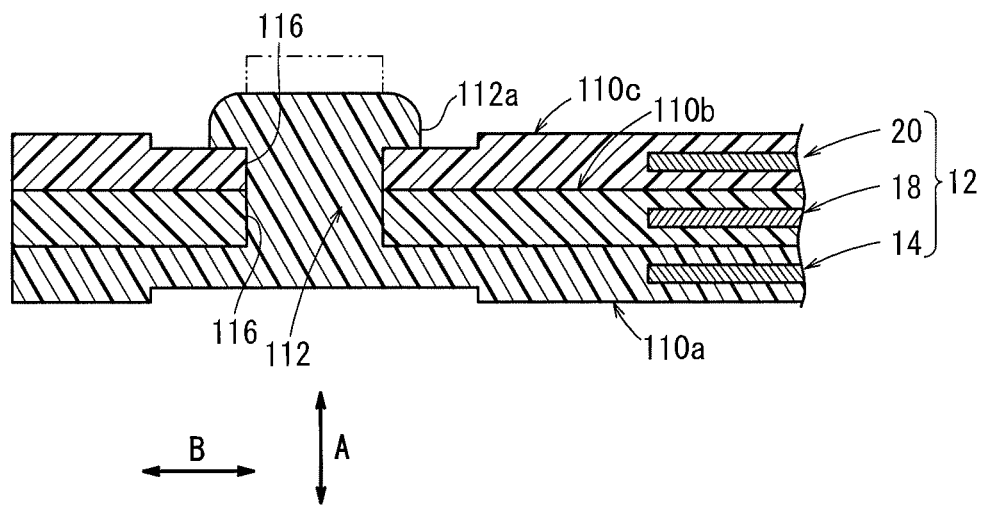
FIG. 5 is a cross sectional view showing a resin connecting section of the fuel cell, taken along a line V-V in FIG. 1.

A molding surface 120a having a predetermined shape is provided at the front end of the welding chip 120. Therefore, when the molding surface 120a contacts the front end of the coupling pin 112, the front end is melted and deformed to form a head 112a (see FIG. 5). The diameter of the head 112a is expanded on the surface 20b of the third separator 20, and molded to have a large diameter which is larger than the diameter of the hole 116. Thus, the first separator 14, the second separator 18, and the third separator 20 can be assembled together.

As described above, after components of each of the cell units 12 are tightened together, a predetermined number of the cell units 12 are stacked together to form the fuel cell 10.

Next, operation of the fuel cell 10 will be described below.

Firstly, as shown in FIG. 1, an oxygen-containing gas is supplied to the oxygen-containing gas supply passage 30a, and a fuel gas such as a hydrogen-containing gas is supplied to the fuel gas supply passage 32a. Further, a coolant such as pure water, ethylene glycol, or oil is supplied to the coolant supply passage 34a.

Thus, the oxygen-containing gas flows from the oxygen-containing gas supply passage 30a into the first oxygen-containing gas flow field 50 of the second separator 18 and the second oxygen-containing gas flow field 66 of the third separator 20 (see FIGS. 3 and 4). The oxygen-containing gas moves along the first oxygen-containing gas flow field 50 in the gravity direction indicated by the arrow C, and the oxygen-containing gas is supplied to the cathode 26 of the first membrane electrode assembly 16a. Further, the oxygen-containing gas moves along the second oxygen-containing gas flow field 66 in the direction indicated by the arrow C, and the oxygen-containing gas is supplied to the cathode 26 of the second membrane electrode assembly 16b (see FIG. 1).

As shown in FIGS. 2 and 3, the fuel gas flows from the fuel gas supply passage 32a into the grooves 84a, 96a formed between the first separator 14 and the second separator 18. As shown in FIG. 2, the fuel gas supplied into the grooves 84a flows through the outer supply holes 82a, and moves toward the surface 14b of the first separator 14. Further, the fuel gas flows through the grooves 84b, and moves from the inner supply holes 82b toward the surface 14a.

Thus, as shown in FIG. 2, the fuel gas flows through the grooves 84b toward the inlet buffer 38. Then, the fuel gas flows along the first fuel gas flow field 36, and moves in the gravity direction indicated by the arrow C. The fuel gas is supplied to the anode 24 of the first membrane electrode assembly 16a.

Further, as shown in FIG. 3, after the fuel gas flows into the grooves 96a, the fuel gas moves through the supply holes 94, and moves toward the surface 18b of the second separator 18. Thus, as shown in FIG. 1, after the fuel gas is supplied to the inlet buffer 60 on the surface 18b, the fuel gas moves along the second fuel gas flow field 58 in the direction indicated by the arrow C, and the fuel gas is supplied to the anode 24 of the second membrane electrode assembly 16b.

Thus, in each of the first membrane electrode assembly 16a and the second membrane electrode assembly 16b, the oxygen-containing gas supplied to the cathode 26 and the fuel gas supplied to the anode 24 are consumed in electrochemical reactions at catalyst layers of the cathode 26 and the anode 24 for generating electricity.

Then, the oxygen-containing gas consumed at the cathode 26 of each of the first and second membrane electrode assemblies 16a, 16b flows along the oxygen-containing gas discharge passage 30b, and the oxygen-containing gas is discharged in the direction indicated by the arrow A.

As shown in FIG. 2, the fuel gas consumed at the anode 24 of the first membrane electrode assembly 16a flows from the outlet buffer 40 through the inner discharge holes 86b, and the fuel gas is discharged toward the surface 14b of the first separator 14.

As shown in FIG. 1, the fuel gas discharged to the surface 14b flows into the outer discharge holes 86a, and again moves toward the surface 14a of the first separator 14. Thus, as shown in FIG. 2, the fuel gas flows from the outer discharge holes 86a through the grooves 88a, and the fuel gas is discharged into the fuel gas discharge passage 32b.

Further, the fuel gas consumed at the anode 24 of the second membrane electrode assembly 16b flows from the outlet buffer 62 through the discharge holes 98 toward the surface 18a of the second separator 18. As shown in FIG. 3, the fuel gas is discharged into the fuel gas discharge passage 32b through the grooves 100a.

As shown in FIG. 1, the coolant supplied to the coolant supply passage 34a flows into the coolant flow field 44 formed between the first separator 14 and the third separator 20, and flows in the direction indicated by the arrow B. Thus, after the coolant cools the first and second membrane electrode assemblies 16a, 16b, the coolant is discharged into the coolant discharge passage 34b.

In the first embodiment, the coupling pin 112 is molded integrally with the resin connecting section 110a provided in the first separator 14. After the coupling pin 112 is inserted into the hole 116 in each of the second and third separator 18, 20, the front end of the coupling pin 112 is welded to assemble the cell unit 12.

Thus, the cell units 12 can be assembled simply, and the overall assembling operation of the fuel cell 10 can be performed rapidly and easily.

Further, at the time of disassembling the assembled fuel cell 10 for replacement of parts due to failures, or for analysis, firstly, the head 112a of the coupling pin 112 is removed, and the components of the cell units 12 are separated from one another. In the meanwhile, the rebuilt pins 118 as separate components are prepared (see FIG. 1).

Then, in a state where the first separator 14, the second separator 18, and the third separator 20 sandwiching the first membrane electrode assembly 16a and the second membrane electrode assembly 16b are stacked together, the rebuilt pin 118 is inserted into, e.g., each first hole 114a.

As shown in FIG. 6, the column 118b of the rebuilt pin 118 is inserted into each first hole 114a, and the flange 118a contacts the first separator 14. Thus, the flange 118a is supported by the first separator 14. In this state, welding treatment is applied to the front end of the column 118b, for example, through the welding chip 120 to form the head 118c. Therefore the cell unit 12 is sandwiched between the flange 118a and the head 118c of the rebuilt pin 118. In this manner, reassembling is performed.

In the adjacent unit cell units 12, one set of rebuilt pins 118 are inserted into the first holes 114a of one of the adjacent cell units 12, and another set of rebuilt pins 118 are inserted into the second hole 114b of the other cell unit 12. Thus, in the adjacent cell units 12, the rebuilt pins 118 are arranged in a zigzag pattern in the stacking direction. Therefore, interference between the rebuilt pins 118 is prevented, and the dimension in the stacking direction is reduced as much as possible.

As described above, at the time of reassembling the cell unit 12, instead of the coupling pins 112, the rebuilt pins 118 as separate components are used. Simply by inserting the rebuilt pin 118 into the first holes 114a or the second holes 114b, reassembling operation of the cell unit 12 is performed rapidly and suitably.

At the time of reassembling the cell unit 12, the rebuilt pins 118 are inserted into the first holes 114a, and at the time of second reassembling of the cell unit 12, the rebuilt pin 118 can be inserted into the second holes 114b. Since the cell unit 12 can be assembled easily multiple times, it becomes possible to suitably perform various operations such as replacement of parts or analysis of the cell unit 12.

Therefore, even if any of the first membrane electrode assembly 16a and the second membrane electrode assembly 16b needs to be repaired or replaced, the first separator 14, the second separator 18, and the third separator 20 can be used again. This is economically advantageous. Further, operation of disassembling and reassembling the cell unit 12 is simplified dramatically.

Figure 8:
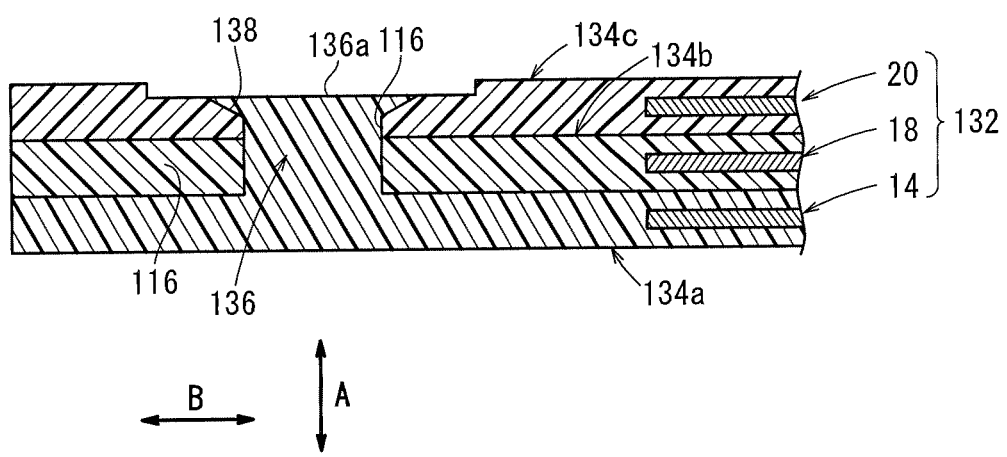
FIG. 8 is a cross sectional view showing main components of a cell unit of a fuel cell according to a second embodiment of the present invention.

FIG. 8 is a cross sectional view showing main components of a cell unit 132 of a fuel cell 130 according to a second embodiment of the present invention.

The constituent elements that are identical to those of the fuel cell 10 according to the first embodiment are labeled with the same reference numerals, and description thereof will be omitted. Likewise, in third and other embodiments described later, the constituent elements that are identical to those of the fuel cell 10 according to the first embodiment are labeled with the same reference numerals, and description thereof will be omitted.

A cell unit 132 includes the first separator 14, the second separator 18, and the third separator 20, and resin connecting sections 134a, 134b, and 134c are provided in the outer circumferential ends of the first separator 14, the second separator 18, and the third separator 20, respectively. A coupling pin 136 projecting in the stacking direction is molded integrally with each resin connecting section 134a provided in the first separator 14. The third separator 20 has a tapered surface 138 around the hole 116.

In the second embodiment, the coupling pin 136 molded integrally with the resin connecting section 134a of the first separator 14 is inserted into the hole 116 formed in each of the second separator 18 and the third separator 20. Then, the front end of the coupling pin 136 is welded to form a conical head 136a.

The head 136a is formed along the profile of the tapered surface 134 of the third separator 20. In the structure, the first separator 14, the second separator 18, and the third separator 20 are positioned in alignment with each other. In this state, the first separator 14, the second separator 18, and the third separator 20 are assembled. Thus, the second embodiment offers improvement in the positioning accuracy, in addition to the same advantages as in the case of the first embodiment.

Figure 9:
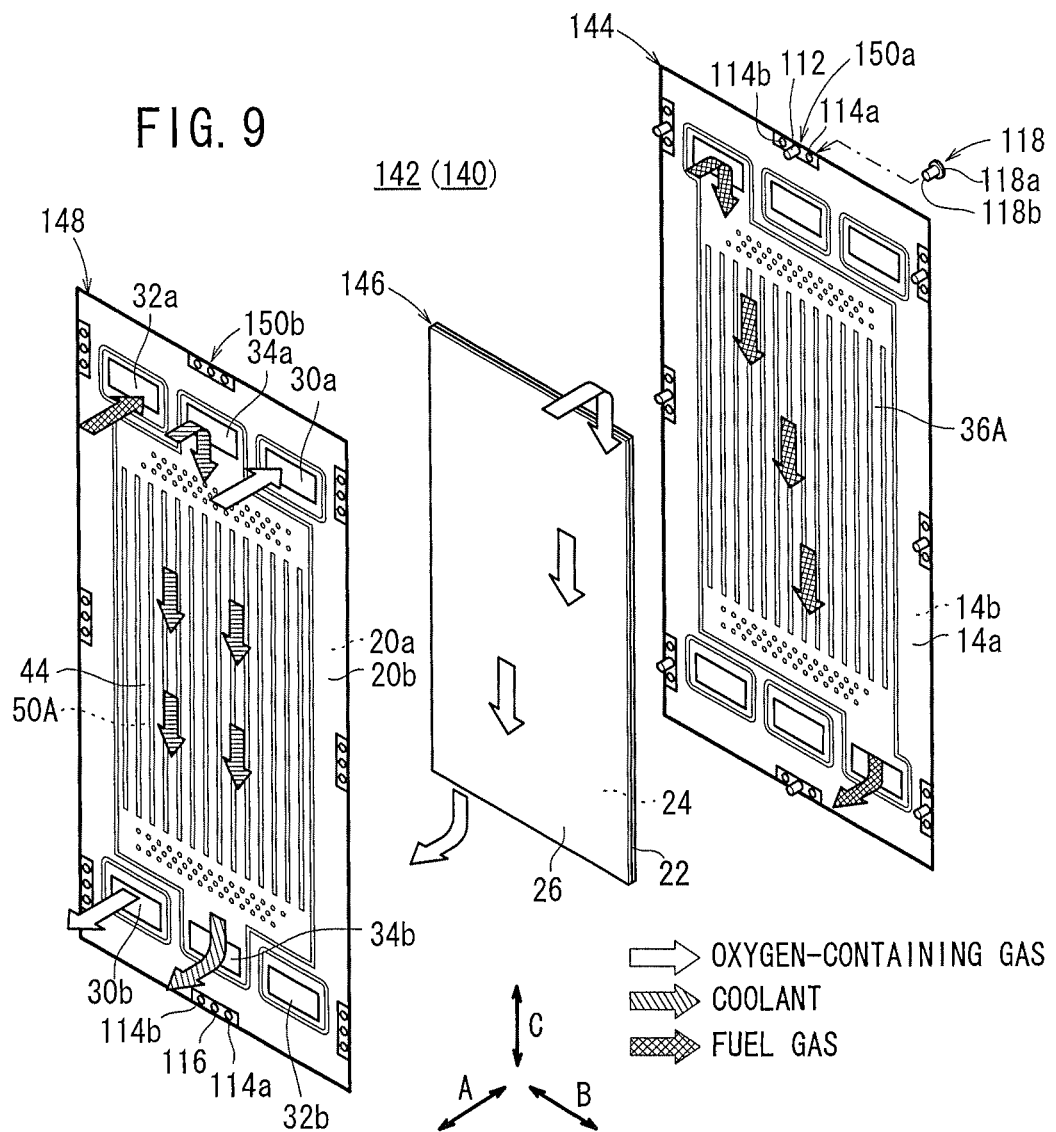
FIG. 9 is an exploded perspective view showing main components of a fuel cell according to a third embodiment of the present invention.

FIG. 9 is an exploded perspective view showing main components of a fuel cell 140 according to a third embodiment of the present invention.

The fuel cell 140 is formed by stacking a plurality of cell units 142. Each of the cell units 142 includes a first separator 144, a membrane electrode assembly 146, and a second separator 148.

At an upper end of the cell unit 142 in a longitudinal direction indicated by an arrow C, an oxygen-containing gas supply passage 30a, a fuel gas supply passage 32a, and a coolant supply passage 34a are formed. At a lower end of the cell unit 142 in the longitudinal direction, an oxygen-containing gas discharge passage 30b, a fuel gas discharge passage 32b, and a coolant discharge passage 34b are formed.

The first separator 144 has a fuel gas flow field 36A on its surface 14a facing the membrane electrode assembly 146, and the second separator 148 has an oxygen-containing gas flow field 50A on its surface 20a facing the membrane electrode assembly 146. A coolant flow field 44 is formed between a surface 14b of the first separator 144 and a surface 20b of the second separator 148.

Figure 10:
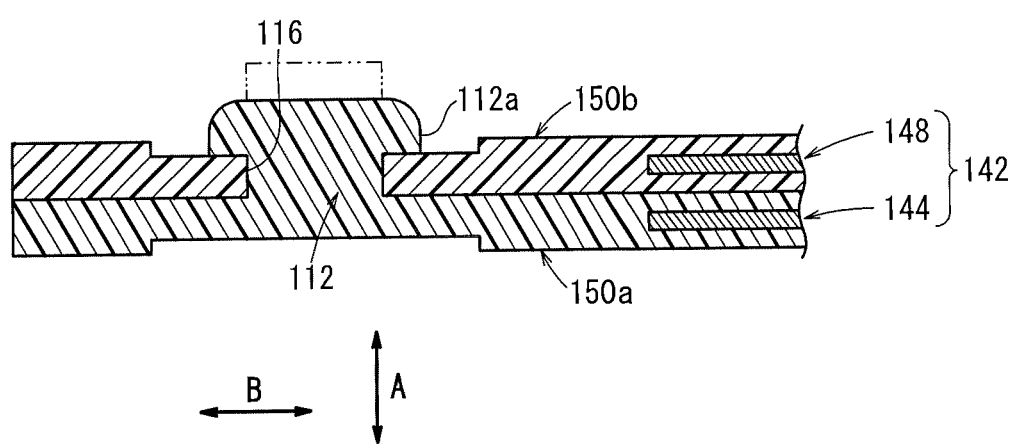
FIG. 10 is a cross sectional view showing a resin connecting section of the fuel cell.

As shown in FIGS. 9 and 10, a plurality of resin connecting sections 150a are provided in the outer circumferential end of the first separator 144, and a plurality of resin connecting sections 150b are provided in the outer circumferential end of the second separator 148, corresponding to the resin connecting sections 150a.

A coupling pin 112 is formed integrally with the central portion of each resin connecting section 150a, and in the resin connecting section 150a, at least a first hole 114a and a second hole 114b are formed on both sides of the coupling pin 112. A hole 116 is formed at the center of each resin connecting section 150b, and in the resin connecting section 150b, at least the first hole 114a and the second hole 114b are formed on both sides of the hole 116. In the third embodiment having the above structure, the same advantages as in the case of the first embodiment are obtained. Further, structure of the second embodiment may be adopted.

Figure 11:
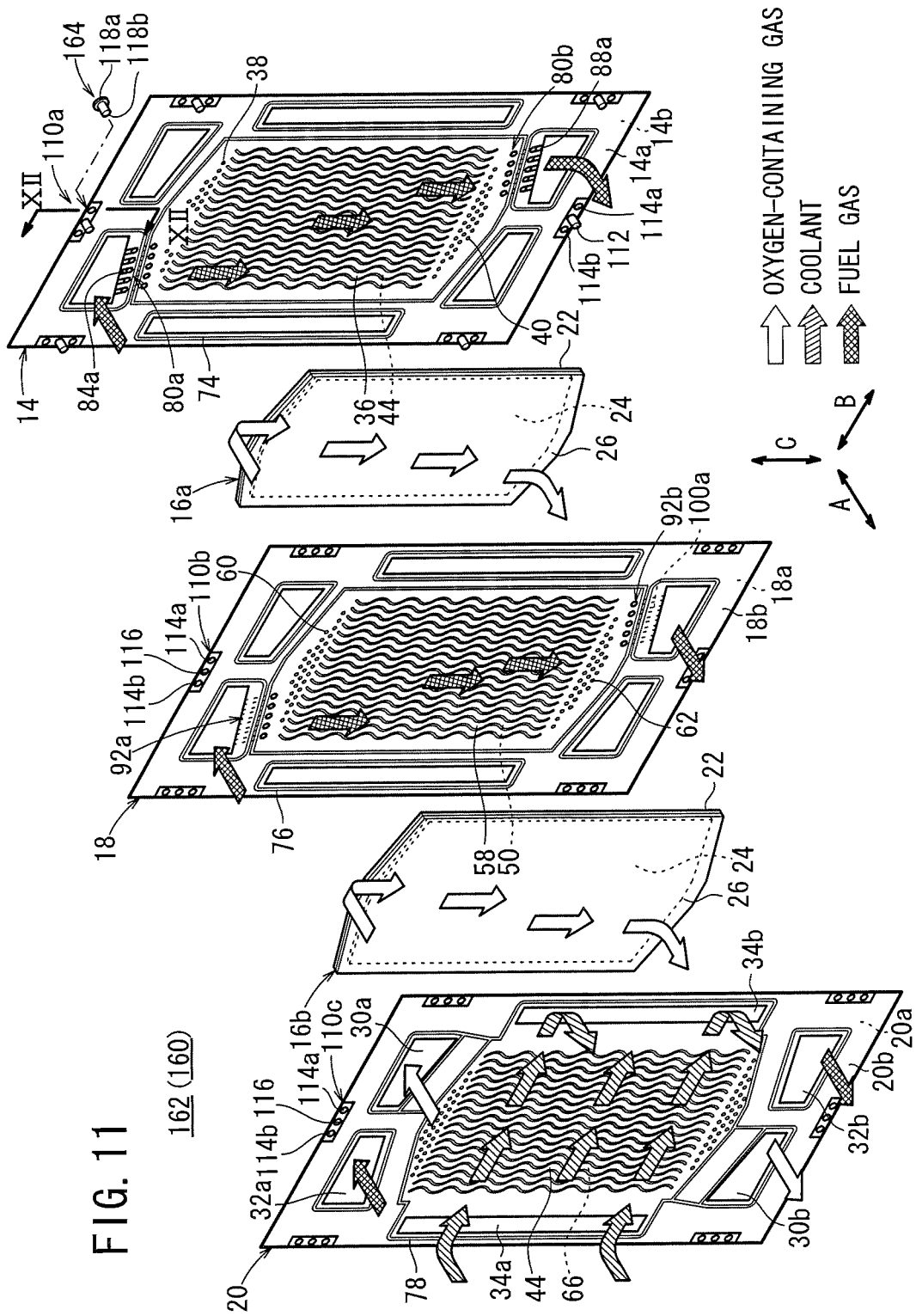
FIG. 11 is an exploded perspective view showing main components of a fuel cell according to a fourth embodiment of the present invention.

FIG. 11 is an exploded perspective view showing main components of a fuel cell 160 according to a fourth embodiment of the present invention.

The fuel cell 160 is formed by stacking a plurality of cell units 162, and each of the cell units 162 includes a first separator 14, a first membrane electrode assembly 16a, a second separator 18, a second membrane electrode assembly 16b, and a third separator 20. Components of the cell unit 162 are joined together by joint pins (rebuilt pins, second resin coupling members) 164.

Figure 12:
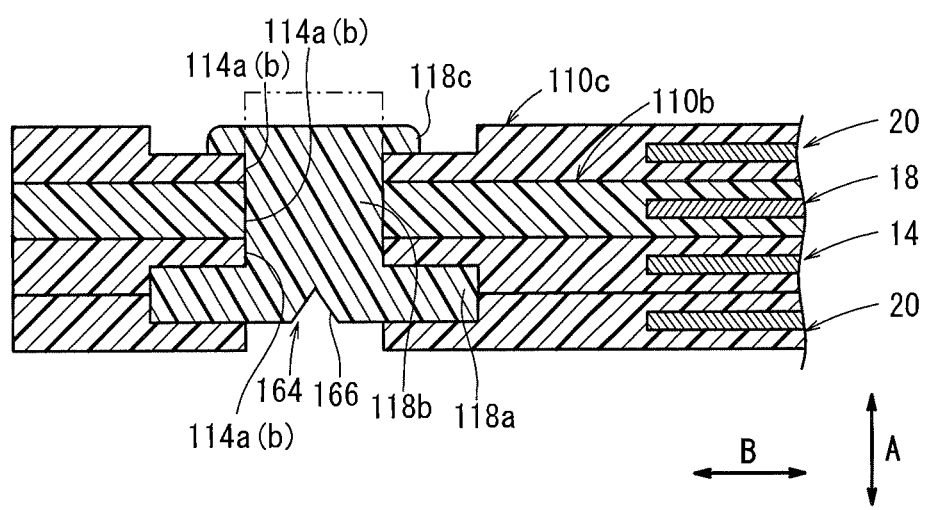
FIG. 12 is a cross sectional view showing a state where a joint pin is inserted into a resin connecting section of the fuel cell, taken along a line XII-XII in FIG. 11.

As shown in FIG. 12, the joint pin 164 has the same structure as the rebuilt pin 118. A recess 166 for holding the joint pin 164 by suction is formed in a flange 118a of the joint pin 164 having a large diameter. The recess 166 is tapered such that the diameter of the recess 166 is reduced inwardly in the axial direction of the joint pin 164 indicated by the arrow A.

Figure 13:
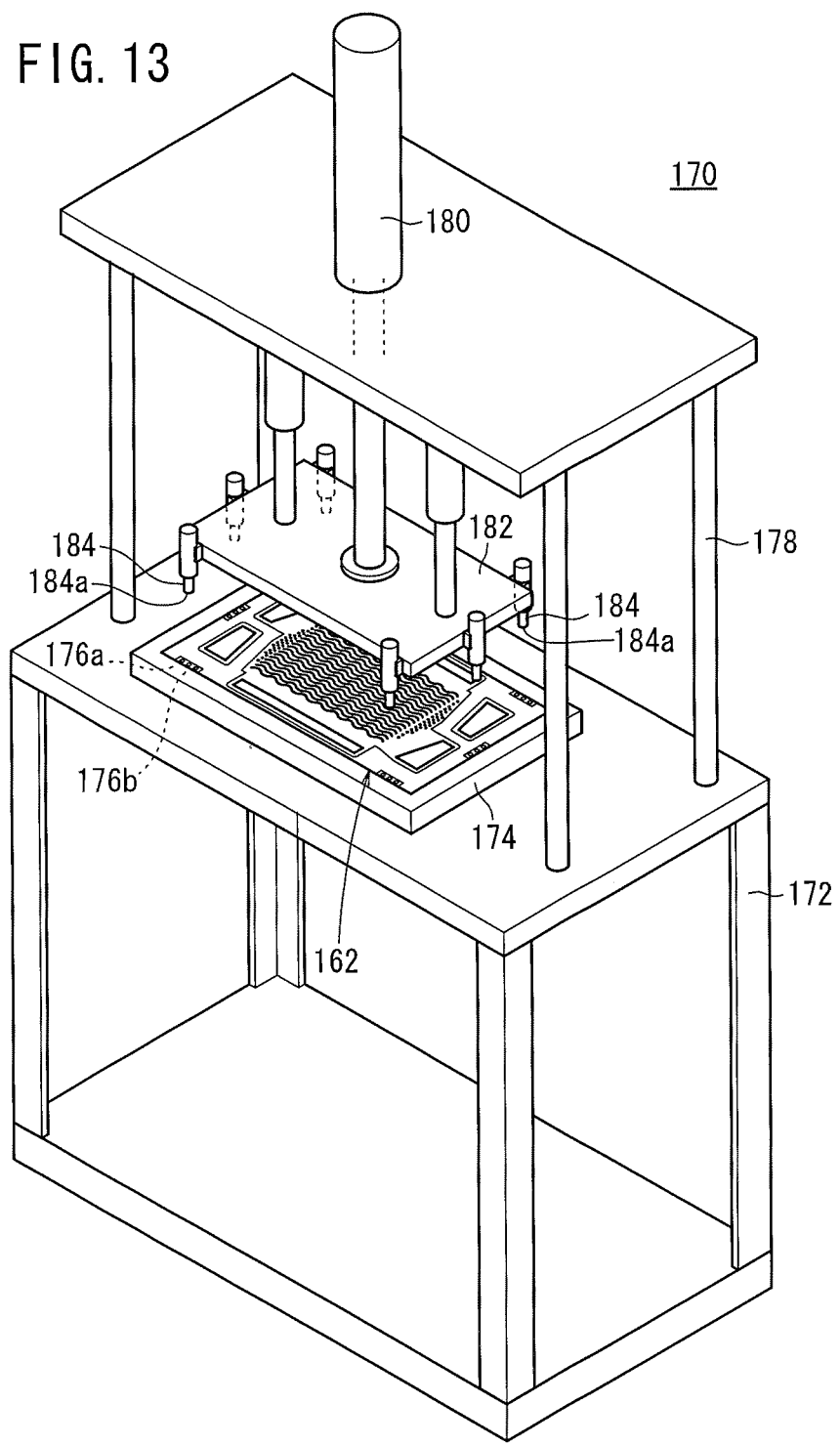
FIG. 13 is a perspective view schematically showing a welding machine.

As shown in FIG. 13, a welding machine 170 for applying welding treatment to the coupling pins 112 and the joint pins 164 has a suction table 174 placed on a table 172 having legs. The suction table 174 has six suction holes 176a at positions corresponding to the first holes 114a, and six suction holes 176b at positions corresponding to the second holes 114b. Each of the suction holes 176a, 176b is connected to a negative pressure generation source (not shown).

A plurality of columns 178 vertically stand outside the suction table 174. An elevation actuator (e.g., linear motor) 180 is attached to an upper portion of the columns 178. An elevation base 182 is attached to the elevation actuator 180. The elevation base 182 is equipped with six welding chips 184, corresponding to the coupling pins 112 and the joint pins 164. The welding chips 184 are heated to a predetermined temperature, e.g., 250° C. to 300° C., and a molding surface 184a having a predetermined shape is provided at the front end of each of the welding chips 184 (see FIG. 14).

Figure 15:
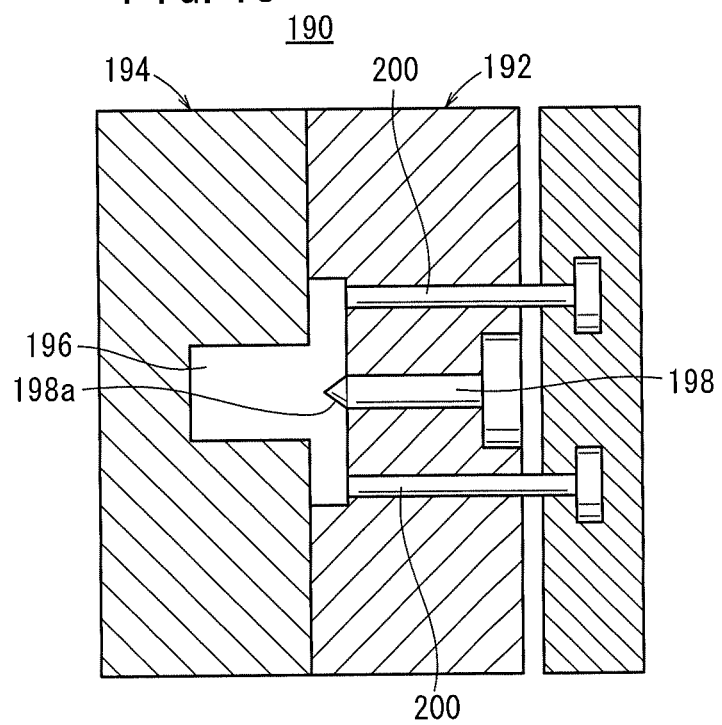
FIG. 15 is a view schematically showing a molding machine.

FIG. 15 is a view schematically showing a molding machine 190 for molding the joint pin 164. The molding machine 190 includes a fixed die 192 and a movable die 194. A cavity 196 is formed between the fixed die 192 and the movable die 194. A core pin 198 and eject pins 200 are provided in the fixed die 192. A tapered surface 198a corresponding to the recess 166 of the joint pin 164 is formed at the front end of the core pin 198.

Figure 16:
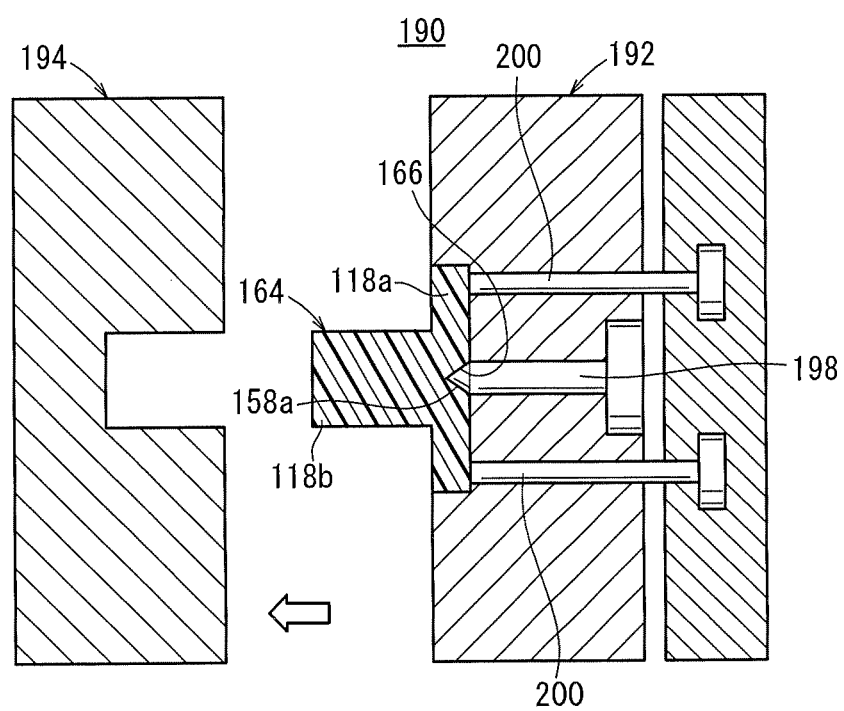
FIG. 16 is a view schematically showing a state where dies of the molding machine are opened.

In the molding machine 190, in a state where the fixed die 192 and the movable die 194 are closed, the cavity 196 is filled with melted resin. After the melted resin is solidified in the cavity 196 to mold the joint pin 164, the movable die 194 moves away from the fixed die 192 (see FIG. 16).

Figure 17:
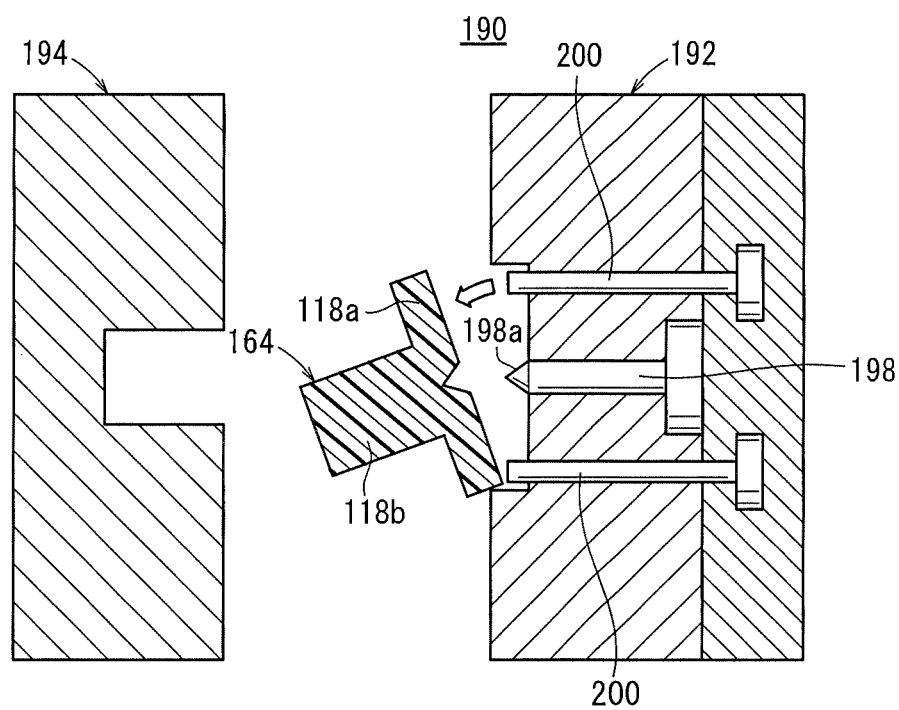
FIG. 17 is a view showing a state where a joint pin is removed from the molding machine.

At this time, in the joint pin 164, by contraction of the injected resin, the tapered surface 198a of the core pin 198 tightly contacts the recess 166 of the large diameter flange 118a. Therefore, the joint pin 164 is reliably held by the core pin 198, and removed from the movable die 194. Then, the eject pins 200 are pushed toward the large diameter flange 118a to remove the joint pin 164 from the fixed die 192 (see FIG. 17). Accordingly, improvement in the performance of molding the joint pin 164 is achieved suitably.

Operation of assembling the fuel cell 160 will be described below.

Figure 14:
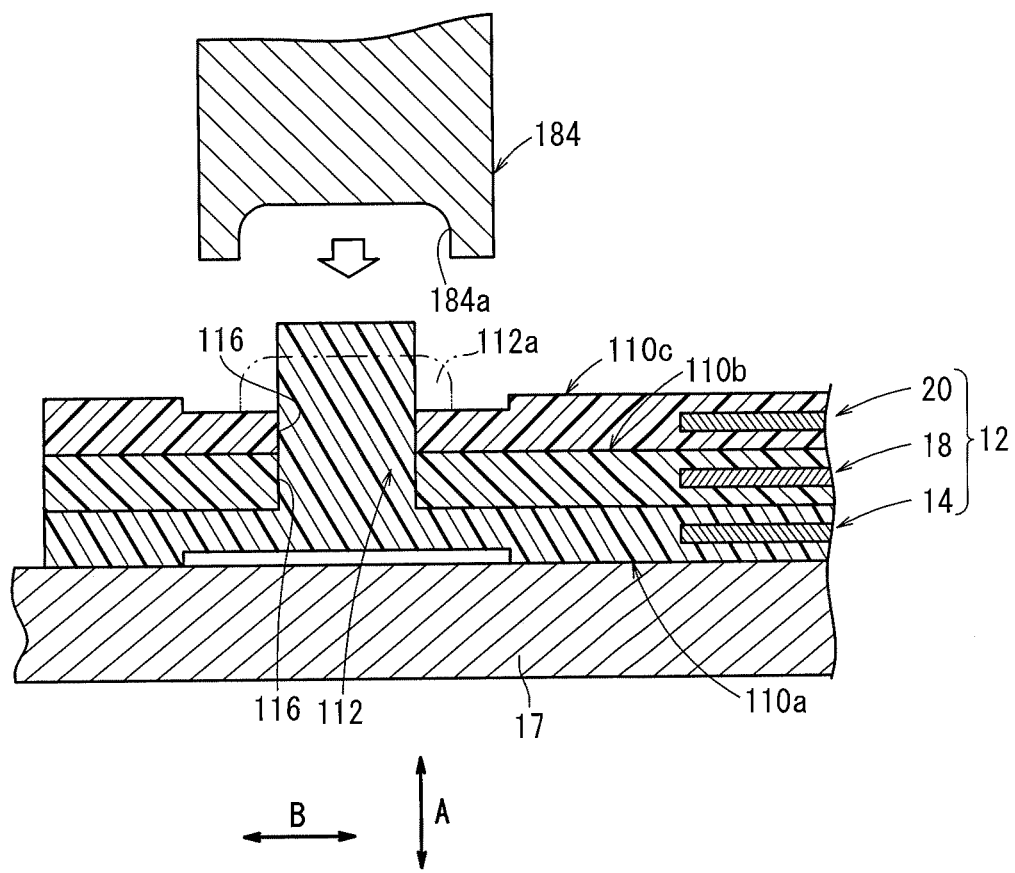
FIG. 14 is a cross sectional view showing a state where the fuel cell is assembled using the resin connecting section.

At the time of newly assembling each of the cell units 162, as shown in FIG. 14, the coupling pin 112 provided in each of the resin connecting sections 110a of the first separator 14 is inserted into the hole 116 of each of the resin connecting sections 110b, 110c of the second separator 18 and the third separator 20.

In this state, as shown in FIG. 13, by operation of the elevation actuator 180, the six welding chips 184 of the welding machine 170 are lowered together with the elevation base 182. Thus, the molding surface 184a of each of the welding chips 184 contacts the front end of each coupling pin 112.

In this state, for example, each of the welding chips 184 is heated to a temperature in a range of 250° C. to 300° C., and the welding chip 184 is pressed against the front end of the coupling pin 112 at a pressure in a range of 1 N to 2 N for a period in a range of 10 to 30 seconds. Therefore, the front end of each coupling pin 112 is melted and deformed to form a head 112a. The diameter of the head 112a is expanded on the surface 20b of the third separator 20, and molded to have a large diameter which is larger than the hole 116. Thus, the first separator 14, the second separator 18, and the third separator 20 are assembled together.

As described above, components of each of the cell units 12 are tightened together by the coupling pins 112 to form the fuel cell 160.

Then, at the time of disassembling the assembled fuel cell 160 for replacement of parts due to failures, or for analysis, firstly, the heads 112a of the coupling pins 112 are removed, and components of each of the cell units 12 are separated from one another. In the meanwhile, the joint pins 164 as separate components are prepared (see FIG. 11).

Figure 18:
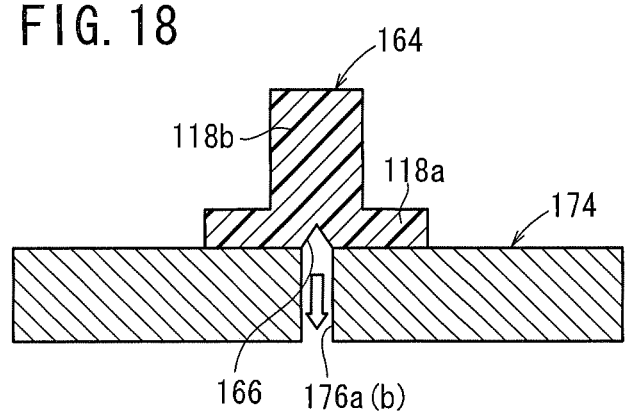
FIG. 18 is a view showing a state where the joint pin is suctioned and held on a suction table.

As shown in FIG. 18, the joint pins 164 are placed on the suction table 174 of the welding machine 170, e.g., at positions corresponding to the suction holes 176a. Then, the recess 166 of each of the joint pins 164 is suctioned through the suction hole 176a by operation of the negative pressure generation source (not shown). Thus, the joint pins 164 are suctioned, and held on the suction table 174.

At this time, the recess 166 is tapered such that the diameter of the recess 166 is reduced inwardly in the axial direction of the joint pin 164. Therefore, the recess 166 has a high concentricity. By suctioning the recess 166, the joint pin 164 is reliably and fixedly positioned at the desired working position with a high degree of accuracy.

Figure 19:
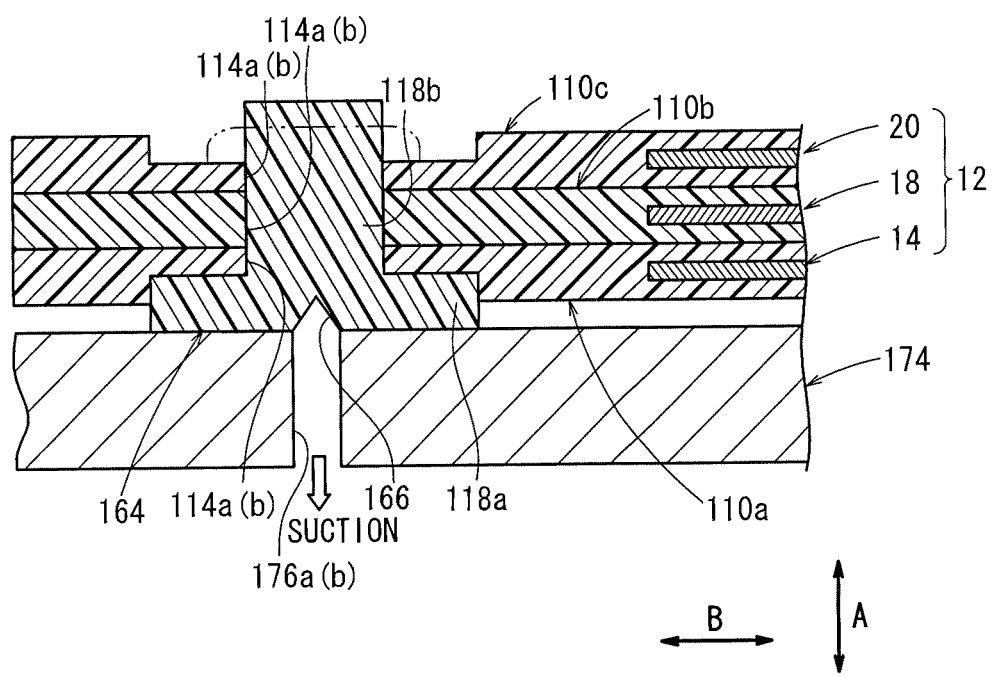
FIG. 19 is a view showing a state where the fuel cell is placed at the joint pin.

Then, as shown in FIG. 19, the first separator 14, the second separator 18, and the third separator 20 sandwiching the first membrane electrode assembly 16a and the second membrane electrode assembly 16b are stacked together on the suction table 174. The joint pin 164 is inserted into each first hole 114a.

The column 118b of the joint pin 164 is inserted into the first hole 114a. The large diameter flange 118a contacts the first separator 14, and the large diameter flange 118a is supported by the first separator 14. In this state, by operation of the elevation actuator 180, the six welding chips 184 are lowered together with the elevation base 182.

As a result, the welding treatment is applied to the front end of each column 118b through each welding chip 184 to form a head 118c. Components of the cell unit 162 are sandwiched between the large diameter flange 118a and the head 118c of the joint pin 164, and the fuel cell 160 is reassembled.

In the adjacent cell units 162, one set of joint pins 164 are inserted into the first holes 114a of one of the adjacent cell units 162, and another set of joint pins 164 are inserted into the second holes 114b of the other cell unit 162. Thus, in the adjacent cell units 162, the joint pins 164 are arranged in a zigzag pattern in the stacking direction. Therefore, interference between the joint pins 164 is prevented, and the dimension in the stacking direction is reduced as much as possible.

As described above, at the time of reassembling the cell units 162, instead of the coupling pins 112, the joint pins 164 as the separate components are used. By simply inserting the joint pins 164 into the first holes 114a or the second holes 114b, reassembling operation of the cell units 162 is performed rapidly and suitably.

Further, in the fourth embodiment, the recess 166 is formed in the large diameter flange 118a of the joint pin 164. Therefore, by suctioning the recess 166 on the suction table 174, each of the joint pins 164 can be fixedly positioned reliably. Thus, in the state where the respective joint pins 164 are fixedly positioned, the cell unit 162 can be provided integrally with the respective joint pins 164.

Thus, in the case where particularly a large number of small joint pins 164 are used, the operation of assembling components of the cell units 162 together through the joint pins 164 is accurately and rapidly performed. Improvement in the operation of producing the fuel cell 160 is achieved easily.

While the invention has been particularly shown and described with reference to preferred embodiments, it will be understood that variations and modifications can be effected thereto by those skilled in the art without departing from the spirit of the invention as defined by the appended claims.

What is claimed is:

1. A fuel cell formed by stacking a membrane electrode assembly and separators in a stacking direction, the membrane electrode assembly including a pair of electrodes and an electrolyte membrane interposed between the electrodes, the fuel cell comprising:
    a plurality of resin connecting sections provided in an outer circumferential end of each of the separators for tightly connecting the separators provided at opposite ends in the stacking direction by a first resin coupling member,
    wherein each resin connecting section in the plurality of resin connecting sections additionally includes at least a first connecting portion and a second connecting portion for allowing insertion of resin coupling members for tightly connecting the separators at opposite ends in the stacking direction, and
    wherein, in operation of the fuel cell, at least one of the first connecting portion or the second connecting portion is without a resin coupling member to allow insertion of a replacement resin coupling member.

2. A fuel cell according to claim 1, wherein at least one of the resin coupling members are molded integrally with at least one of the plurality of resin connecting sections provided in the separator positioned at one end in the stacking direction.

3. A fuel cell according to claim 1, wherein an end of at least one of the resin coupling members are inserted into a hole formed in at least one of the plurality of resin connecting sections of the separator, and welded to the at least one of the plurality of resin connecting sections.

4. A fuel cell according to claim 1, wherein the replacement resin coupling member is provided as a component separated from the plurality of resin connecting sections.

5. A fuel cell according to claim 1, wherein the replacement resin coupling member includes a large diameter flange engaged with one end of the fuel cell in the stacking direction, and a head engaged with the other end of the fuel cell in the stacking direction; and
    a recess for holding the replacement resin coupling member by suction is formed in the large diameter flange.

6. A fuel cell according to claim 5, wherein the recess is tapered such that the diameter of the recess is reduced inwardly in an axial direction of the replacement resin coupling member.

7. A fuel cell comprising a cell unit formed by stacking a membrane electrode assembly and separators, the membrane electrode assembly including a pair of electrodes and an electrolyte membrane interposed between the electrodes, the membrane electrode assembly and the separators of the cell unit being joined together by a joint pin at one of a plurality of resin connecting sections provided in an outer circumferential end of each of the separators,
    the joint pin comprising:
    a large diameter flange engaged with one end of the cell unit; and
    a head engaged with the other end of the cell unit,
    wherein a recess for holding the joint pin by suction is formed in the large diameter flange, and
    wherein, in operation of the fuel cell, at least one of the plurality of resin connecting sections include a connecting portion without a resin coupling member to allow insertion of a replacement resin coupling member.

8. A fuel cell according to claim 7, wherein the recess is tapered such that the diameter of the recess is reduced inwardly in the axial direction of the joint pin.

9. A fuel cell according to claim 7, wherein the joint pin is made of resin, and the head is formed by expanding the diameter of an end of a column of the joint pin by welding.

* * * * *